(12) United States Patent
Bonk et al.

(10) Patent No.: US 9,987,951 B2
(45) Date of Patent: Jun. 5, 2018

(54) LOCK FOR VEHICLE SEAT FOUNDATION

(71) Applicant: Faurecia Automotive Seating, LLC, Auburn Hills, MI (US)

(72) Inventors: Jeffery T. Bonk, Chesterfield, MI (US); Dale J. Frye, West Olive, MI (US); Timothy L. Moulton, Newport, RI (US); Jared A. Judson, Medford, MA (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 26 days.

(21) Appl. No.: 15/274,633

(22) Filed: Sep. 23, 2016

(65) Prior Publication Data

US 2017/0080827 A1 Mar. 23, 2017

Related U.S. Application Data

(60) Provisional application No. 62/222,375, filed on Sep. 23, 2015.

(51) Int. Cl.
 *B60N 2/08* (2006.01)
(52) U.S. Cl.
 CPC ......... *B60N 2/0818* (2013.01); *B60N 2/0843* (2013.01)
(58) Field of Classification Search
 CPC ....... B60N 2/06; B60N 2/0818; B60N 2/0843
 See application file for complete search history.

(56) References Cited

U.S. PATENT DOCUMENTS

| 4,880,084 | A | 11/1989 | Tanaka | |
|---|---|---|---|---|
| 5,150,771 | A | 9/1992 | Porter | |
| 5,157,826 | A | 10/1992 | Porter | |
| 5,219,045 | A | 6/1993 | Porter | |
| 5,273,242 | A * | 12/1993 | Mouri | B60N 2/067 248/429 |
| 5,441,129 | A | 8/1995 | Porter | |
| 5,865,506 | A | 2/1999 | Sakamoto | |
| 5,899,428 | A | 5/1999 | Gauger | |
| 6,260,922 | B1 * | 7/2001 | Frohnhaus | B60N 2/067 248/424 |
| 7,667,345 | B2 | 2/2010 | Budweg | |
| 7,669,824 | B2 * | 3/2010 | Woehrle | B60N 2/067 248/419 |
| 7,887,020 | B2 | 2/2011 | Ferguson | |
| 2004/0206878 | A1 * | 10/2004 | Borbe | B60N 2/0232 248/424 |
| 2006/0237619 | A1 * | 10/2006 | Nakamura | B60N 2/0232 248/429 |
| 2013/0186217 | A1 * | 7/2013 | Enokijima | B60N 2/067 74/89.33 |

* cited by examiner

*Primary Examiner* — Philip F Gabler
(74) *Attorney, Agent, or Firm* — Barnes & Thornburg LLP

(57) ABSTRACT

A restraint for a vehicle includes a vehicle seat, a foundation, and a lock system. The foundation is configured to interconnect the vehicle seat to the floor to permit movement of the vehicle seat relative to the floor along a predetermined path. The lock system is configured to selectively block movement of the vehicle seat relative to the floor along the predetermined path.

10 Claims, 4 Drawing Sheets

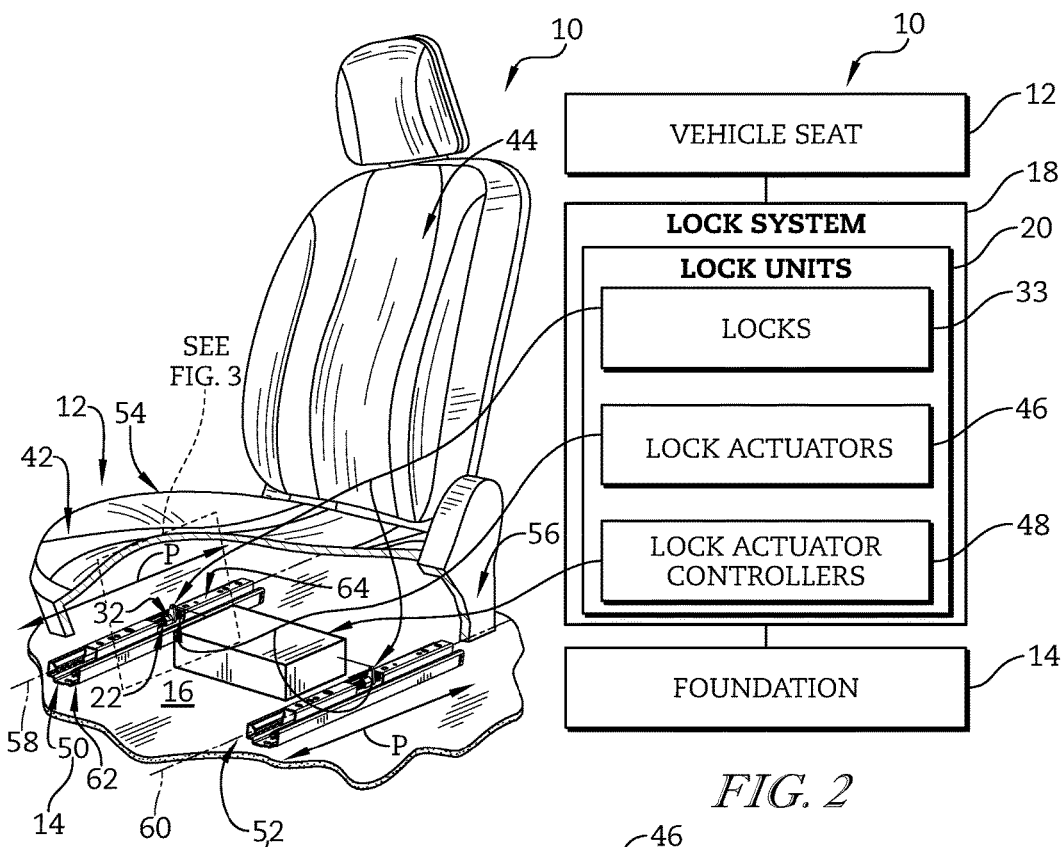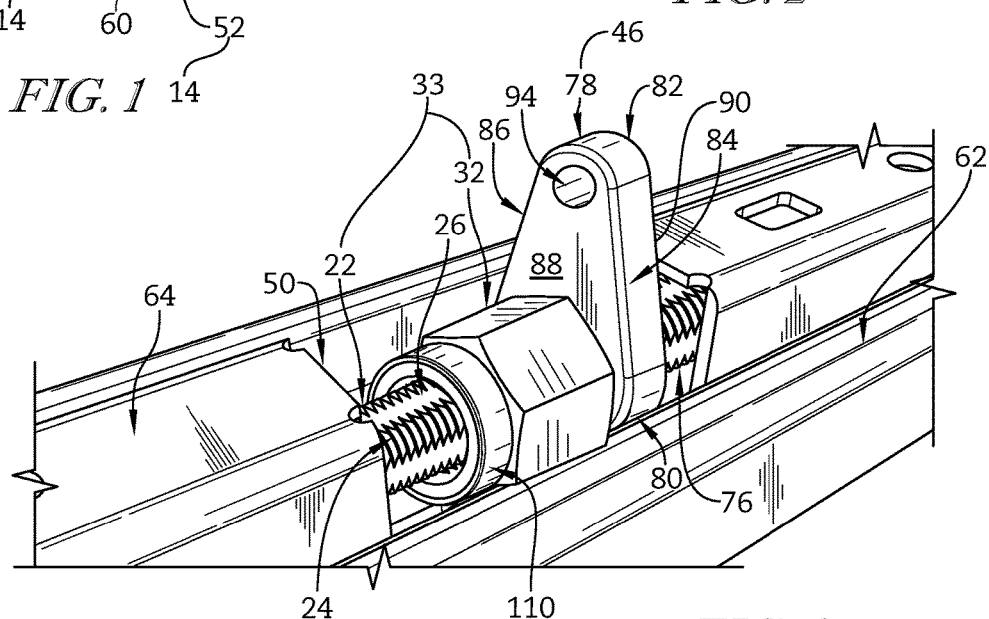

LOCK FOR VEHICLE SEAT FOUNDATION

PRIORITY CLAIM

This application claims priority under 35 U.S.C. § 119(e) to U.S. Provisional Application Ser. No. 62/222,375, filed Sep. 23, 2015, which is expressly incorporated by reference herein.

BACKGROUND

The present disclosure relates to a restraint, and particularly to a restraint for a vehicle. More particularly, the present disclosure relates to a restraint including a vehicle seat and a lock system coupled to the vehicle seat to block movement of the vehicle seat relative to a floor of the vehicle.

SUMMARY

According to the present disclosure, a restraint for a vehicle includes a vehicle seat and a foundation. The vehicle seat is configured to support an occupant of the vehicle above a floor of the vehicle. The foundation is configured to interconnect the vehicle seat to the floor to permit sliding movement of the vehicle seat relative to the floor along a predetermined path.

In illustrative embodiments, the restraint includes a lock system integrated into the foundation. The lock system is configured to block or allow sliding movement of the vehicle seat relative to the floor along the predetermined path.

In illustrative embodiments, the lock system includes a rod and a lock nut. The rod is coupled to the floor in a fixed position relative to the floor. The lock nut is mounted to the vehicle seat to slide with the vehicle seat along the floor. The rod has threads arranged along portions of an outer surface of the rod extending the length of the rod and rod flats positioned between the rod threads along the length of the rod. The lock nut has lock nut threads arranged along portions of an inner surface of the lock nut and lock nut flats positioned between the lock nut threads.

In illustrative embodiments, the lock nut is formed to include an aperture sized to receive the rod and is mounted to rotate relative to the rod between an unlocked position and a locked position. In the unlocked position, the lock nut threads are disengaged from the rod threads to permit movement of the vehicle seat relative to the floor along the predetermined path. In the locked position, the lock nut threads engage the rod threads to block movement of the vehicle seat relative to the floor.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 1 is a perspective view of a restraint in accordance with the present disclosure showing that the restraint includes a vehicle seat for supporting an occupant of a vehicle above a floor of the vehicle, a foundation arranged to interconnect the vehicle seat to the floor to permit sliding movement of the vehicle seat relative to the floor along a predetermined path, and a lock system configured to block or allow sliding movement of the vehicle seat relative to the floor along the predetermined path;

FIG. 2 is a diagrammatic view of the restraint of FIG. 1 showing that the restraint includes the foundation, the lock system coupled to the foundation, and the vehicle seat coupled to the lock system and that the lock system includes lock units having locks arranged to block or allow sliding movement of the vehicle seat relative to the floor along the predetermined path, lock actuators arranged to control operation of the locks, and lock actuator controllers arranged to control operation of the lock actuators;

FIG. 3 is an enlarged perspective view of one of the lock units of FIG. 2 showing that the lock includes a rod that is positioned in an interior space defined by the foundation and a lock nut that is mounted to rotate relative to the rod, that a collar is received by the lock nut, and that the lock nut, the collar, and the lock actuator are engaged with one another and positioned in a cutout formed in the foundation;

FIG. 4 is an exploded assembly view of the lock unit of FIG. 3 showing that the interior space is defined between a rail receiver arranged to couple to the floor to constrain the rail receiver against movement with the vehicle seat relative to the floor and a movable rail arranged to move with the vehicle seat relative to the floor along the predetermined path, that the rod includes external threads that extend along the length of the rod and rod flats that are positioned between the external threads, that the lock nut and the lock actuator are arranged to mount to the rod to rotate relative thereto, and that the collar is arranged to mount to the rod so that the collar is constrained against rotation relative to the rod with the lock nut and the lock actuator;

Figure 7:
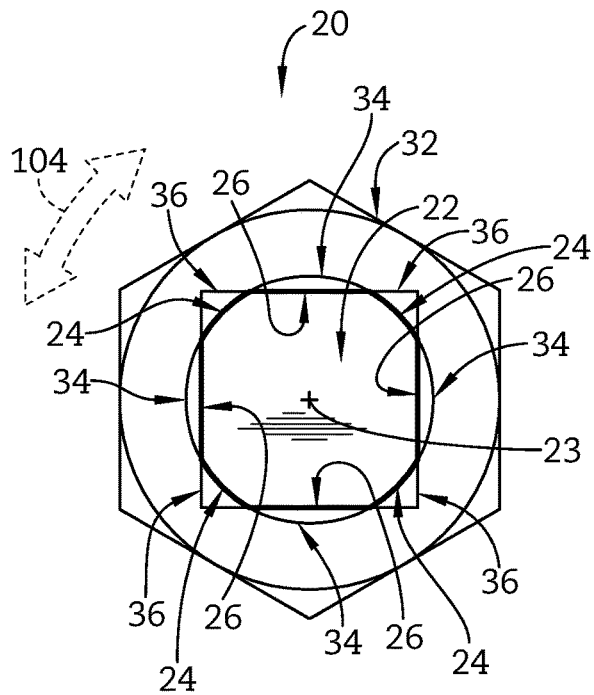
Figure 8:
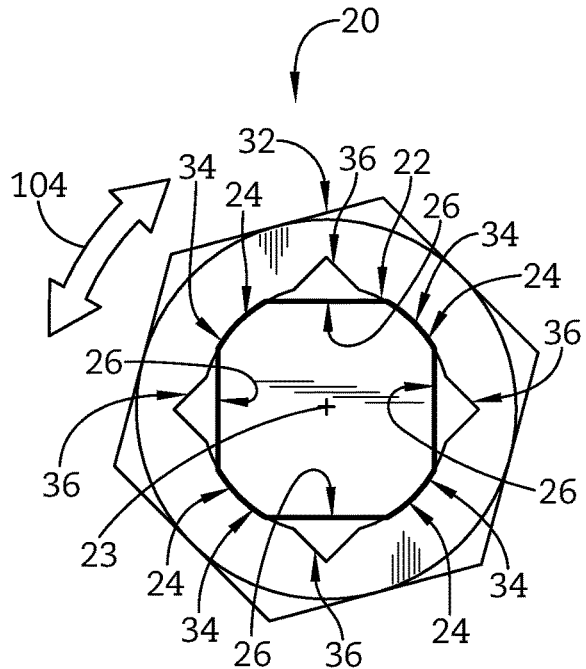

FIG. 7 is a front elevation view of the lock of the lock unit of FIG. 3 showing the lock nut mounted to the rod in an unlocked position in which the lock nut threads are disengaged from the rod threads to permit movement of the vehicle seat relative to the floor along the predetermined path; and FIG. 8 is a view similar to FIG. 7 showing the lock nut mounted to the rod in a locked position in which the lock nut threads are engaged with the rod threads to block movement of the vehicle seat relative to the floor.

DETAILED DESCRIPTION

A restraint 10 in accordance with the present disclosure is configured for use in a vehicle as suggested in FIGS. 1 and 2. Restraint 10 includes vehicle seat 12 and foundation 14. Vehicle seat 12 is configured to support an occupant of the vehicle above floor 16 of the vehicle. Foundation 14 is configured to interconnect vehicle seat 12 to floor 16 to permit movement of vehicle seat 12 relative to floor 16 along predetermined path P. When the occupant is supported by vehicle seat 12, movement of vehicle seat 12 relative to floor 16 along path P adjusts the position of the occupant relative to floor 16.

Restraint 10 includes lock system 18 as shown in FIGS. 1 and 2. Lock system 18 is configured to block or allow sliding movement of vehicle seat 12 relative to floor 16 along predetermined path P. Lock system 18 is configured to provide means for releasing selectively vehicle seat 12 to slide along floor 16 and for holding vehicle seat 12 in a selected position along floor 16 so that the occupant can be ergonomically supported by restraint 10.

Figure 4:
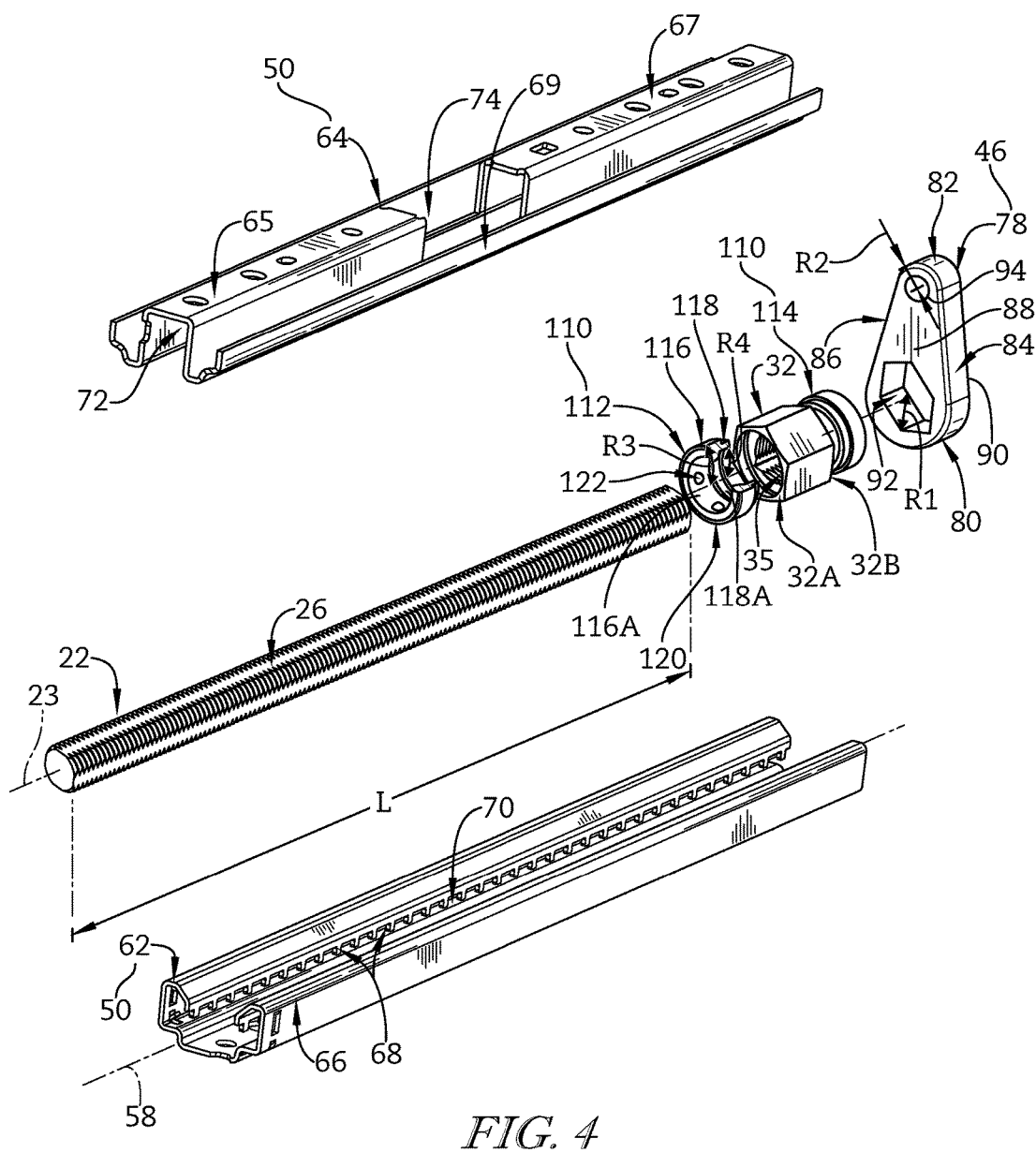
Figure 5:
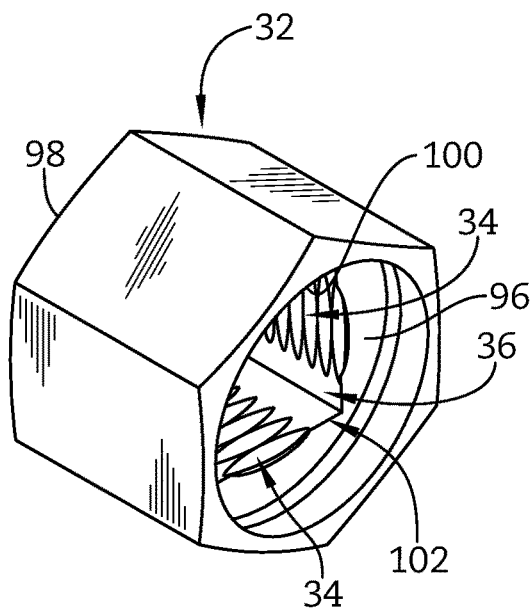
FIG. 5 is a perspective view of the lock nut of the lock unit of FIG. 3 showing that the lock nut includes internal lock nut threads and lock nut flats that are positioned between the lock nut threads.
Figure 6:
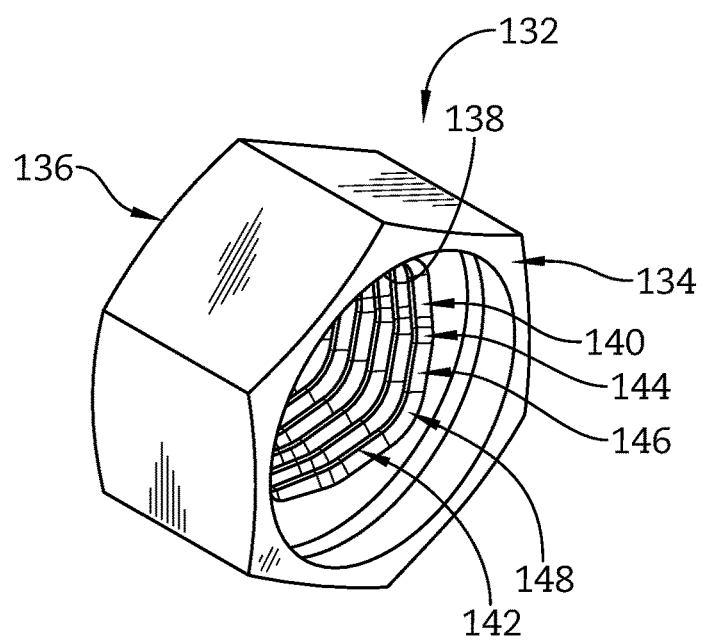
FIG. 6 is a perspective view of another embodiment of a lock nut adapted for use in the locks of FIG. 2 showing that the lock nut includes internal lock nut threads and omits lock nut flats.

Lock system 18 includes lock units 20 as shown in FIGS. 1 and 2. Each lock unit 20 includes rod 22 and lock nut 32. Rod 22 has rod threads 24 that extend along length L of rod 22 and rod flats 26 that are positioned between rod threads 24 along length L as shown in FIGS. 3-4. Lock nut 32 has lock nut threads 34 and lock nut flats 36 that are positioned between lock nut threads 34 as shown in FIGS. 5-7. Lock nut 32 is formed to include an internal aperture 35 that is sized to receive rod 22 therein. Lock nut 32 is mounted to rotate relative to rod 22 between an unlocked position and a locked position. In the unlocked position, lock nut threads 34 are disengaged from rod threads 24 to permit movement of vehicle seat 12 relative to floor 16 along predetermined path P. In the locked position, lock nut threads 34 engage rod threads 24 to block movement of vehicle seat 12 relative to floor 16.

In the illustrative embodiment, lock system 18 includes two substantially identical lock units 20. Each of lock units 20 is configured to block or allow sliding movement of movable component 64 of foundation 14 relative to floor 16 along predetermined path P. In doing so, each of lock units 20 blocks or allows sliding movement of vehicle seat 12 relative to floor 16 along path P. Lock units 20 may therefore be said to block cooperatively or allow sliding movement of vehicle seat 12 relative to floor 16 along path P.

In other embodiments, however, lock system 18 may include only one lock unit 20. In such embodiments, lock unit 20 may be configured to block or allow sliding movement of movable component 64 of foundation 14 relative to floor 16 along predetermined path P. In doing so, lock unit 20 may block or allow sliding movement of vehicle seat 12 relative to floor 16 along path P.

Regardless of whether lock system 18 includes one or two lock units 20, each lock unit 20 is embodied as a generally infinitely positionable lock unit that permits vehicle seat 20 to attain a generally infinite number of positions relative to floor 16 along path P. As such, lock system 18 may be referred to as a generally infinitely positionable lock system.

Regardless of whether lock system 18 includes one or two lock units 20, lock system 18 may be configured to withstand forces applied to restraint 10 to block movement of vehicle seat 12 relative to floor 16. In one example, when lock nut 32 is in the locked position, occupant forces applied by the occupant to restraint 10 may encourage movement of vehicle seat 12 relative to floor 16. Lock system 18 may withstand the occupant forces to block movement of vehicle seat 12 relative to floor 16. In another example, when lock nut 32 is in the locked position, impact forces applied to restraint 10 in response to a vehicle impact may urge movement of vehicle seat 12 relative to floor 16. Lock system 18 may withstand the impact forces to block movement of vehicle seat 12 relative to floor 16.

Vehicle seat 12 includes, for example, seat bottom 42 and seat back 44 as shown in FIGS. 1-2. Seat bottom 42 is coupled to foundation 14 for movement relative to floor 16 along predetermined path P. Seat bottom 42 is arranged to surround at least a portion of foundation 14 and lock system 18 to limit access to foundation 14 and lock system 18 as shown in FIG. 1. Seat back 44 extends upwardly away from seat bottom 42 and is coupled thereto to pivot toward and away from seat bottom 42.

In addition to rod 22 and lock nut 32, which may collectively be referred to as lock 33, each lock unit 20 further includes lock actuator 46 and lock actuator controller 48 as shown in FIGS. 1 and 2. Lock actuator 46 is configured to move lock nut 32 between the unlocked position and the locked position. Lock actuator controller 48 is configured to control the movement of lock actuator 46. As such, lock actuator controller 48 is configured to control the operation of each lock unit 20.

In the illustrative embodiment, one lock actuator controller 48 is included in each lock unit 20 to control the operation of each lock unit 20. In other embodiments, however, one lock actuator controller 48 may be shared by lock units 20. In such embodiments, the one lock actuator controller 48 may be configured to control the movement of lock actuator 46 included in each lock unit 20.

Lock actuator controller 48 may be configured to control the operation of each lock unit 20 based on an action performed by the occupant. In one example, lock actuator controller 48 may be embodied as, or otherwise include, a member that may be acted on by the occupant to cause lock actuator controller 48 to control the operation of each lock unit 20. In another example, lock actuator controller 48 may be acted on by an electrically-powered, pneumatically-powered, or hydraulically-powered device in response to an action performed by the occupant.

In the illustrative embodiment, restraint 10 includes collar 110 as shown in FIG. 3. In other embodiments, however, collar 110 may be omitted from restraint 10.

Collar 110 is configured to center lock nut 32 about rod 22 as lock nut 32 is rotated by lock actuator 46 between the unlocked position and the locked position as suggested by FIG. 3. Centering of lock nut 32 about rod 22 by collar 110 may reduce noise as lock nut 32 slides along rod 22. Collar 110 is received by lock nut 32 and constrained against rotation relative to rod 22 with lock nut 32. Collar 110 permits lock nut 32 to rotate relative to collar 110 and rod 22 between the unlocked position and the locked position.

Foundation 14 includes first rail unit 50 and second rail unit 52 that is substantially identical to first rail unit 50 as suggested in FIG. 1. As such, the components included in only first rail unit 50 and the interrelationships between those components are described in detail below. In other embodiments, foundation 14 may include any suitable number of rail units.

First rail unit 50 and second rail unit 52 interconnect floor 16 with opposite sides 54, 56 of seat bottom 42, respectively, as shown in FIG. 1. First rail unit 50 extends along longitudinal axis 58 and second rail unit 52 extends along longitudinal axis 60. Axes 58, 60 are spaced apart from and extend parallel to one another.

First rail unit 50 illustratively includes rail receiver 62 and movable rail 64 as shown in FIG. 4. Rail receiver 62 is coupled to floor 16 to constrain rail receiver 62 against movement relative to floor 16, and rail receiver 62 defines longitudinal axis 58. Movable rail 64 is coupled to seat bottom 42 and arranged to move relative to rail receiver 62 to cause seat bottom 42 to move relative to floor 16.

Rail receiver 62 illustratively includes rail body 66 as shown in FIG. 4. Rail body 66 is formed to include upwardly opening rail-receiver track 70 that partially defines (i.e., in cooperation with the corresponding feature of second rail unit 52) predetermined path P. Rail-receiver track 70 is sized to receive movable rail 64 to guide movement of movable rail 64 relative to rail receiver 62 along path P. Rail receiver 62 may also include rail teeth 68 that may be arranged to interact with another lock system that may be included in restraint 10.

Movable rail 64 includes downwardly opening rod-receiver track 72 that is formed to include cutout 74 as shown in FIG. 4. Movable rail 64 further includes first section 65, second section 67, and bridge section 69 that interconnects first and second sections 65, 67. Sections 65, 67, 69 cooperate to define cutout 74 and are integrally formed with one another. As such, in the illustrative embodiment, the rail 64 has a monolithic, one-piece construction.

When movable rail 64 is received by rail-receiver track 70, rod 22 is positioned in interior space 76 defined in part between rod-receiver track 72 and rail-receiver track 70 as shown in FIG. 3. When rod 22 is positioned in interior space 76, lock nut 32 is mounted to rod 22 and collar 110 is received by lock nut 32 such that lock nut 32 and collar 110 are positioned in cutout 74 when lock nut 32 is in each of the unlocked position and the locked position as shown in FIG. 3. In the illustrative embodiment, rod 22 is constrained against movement in interior space 76. For example, rod 22 may be secured to rail receiver 62 to constrain rod 22 against movement in interior space 76.

Lock actuator 46 is positioned in cutout 74 to move lock nut 32 between the unlocked position and the locked position as shown in FIG. 3. Lock actuator 46 is engaged with lock nut 32 and collar 110 when lock nut 32, collar 110, and lock actuator 46 are positioned in cutout 74. As a result of such engagement, movement of lock actuator 46 causes movement of lock nut 32 between the unlocked position and the locked position. Even though lock nut 32 is coupled to collar 110, movement of lock actuator 46 does not cause collar 110 to rotate with lock not 32 because collar 110 is constrained against rotation relative to rod 22 with lock nut 32 as indicated above.

Lock actuator 46 includes lever 78 as shown in FIG. 3. Lever 78 includes first arcuate end 80 that has radius R1 and second arcuate end 82 arranged opposite first arcuate end 80 that has radius R2 that is less than radius R1. First and second arcuate ends 80, 82 are interconnected by planar side walls 84, 86 arranged opposite one another. Lever 78 further includes planar faces 88, 90 arranged opposite one another and perpendicular to side walls 84, 86. When lever 78 is engaged with lock nut 32 in cutout 74, face 88 is illustratively engaged with lock nut 32.

Lever 78 is illustratively formed to include lock nut aperture 92 and controller aperture 94 as shown in FIG. 3. Lock nut aperture 92 is sized to receive lock nut 32 and has a generally hexagonal shape. Lock nut aperture 92 may include features configured to interface with lock nut 32 (e.g., threading and/or non-threaded portions) to move lock nut 32 between the unlocked position and the locked position. Lock nut aperture 92 extends adjacent arcuate end 80 through faces 88, 90. Controller aperture 94 is sized to receive lock actuator controller 48 and extends adjacent arcuate end 82 through faces 88, 90.

In embodiments where lock actuator controller 48 is embodied as, or otherwise includes, a member as indicated above, the member may be received by controller aperture 94 of each lock unit 20 as suggested by FIG. 3. In such embodiments, when the member is received by controller aperture 94 of each lock unit 20, the member may be positioned between first and second rail units 50, 52 as suggested by FIG. 1. In embodiments where lock actuator controller 48 is acted on by an electrically-powered, pneumatically-powered, or hydraulically-powered device as indicated above, the electrically-powered, pneumatically-powered, or hydraulically-powered device may be positioned between first and second rail units 50, 52.

Referring again to FIG. 4, rod 22 is shown in detail. In the illustrative embodiment, rod 22 has a metallic construction. For example, rod 22 may be constructed of any one or more of the following materials: aluminum, brass, copper, steel, tin, nickel, or titanium. In other embodiments, however, rod 22 may have another suitable construction.

Rod 22 illustratively extends over length L along longitudinal axis 23 and has a generally rectangular or square shape as shown in FIG. 4. Rod 22 is illustratively embodied as, or otherwise includes, generally all thread rod 22 whose rod threads 24 extend over length L of rod 22 as indicated above. In the illustrative embodiment, rod threads 24 are external threads. Rod flats 26, which are positioned between rod threads 24 over length L of rod 22 as indicated above, are illustratively embodied as, or otherwise include, generally smooth, non-threaded segments. Rod flats 26 may be substantially planar or may include curved portions.

Collar 110 is shown, for example, in FIG. 4. In the illustrative embodiment, collar 110 is constructed of one or more lubricious, polymeric materials. For example, collar 110 may be constructed of a plastics material including, but not limited to, delrin or polyethylene. In other embodiments, however, collar 110 may have another suitable construction.

Collar 110 illustratively includes first collar component 112 and second collar component 114 as shown in FIG. 4. First and second collar components 112, 114 are substantially identical to one another and interact with lock nut 32 in substantially identical fashion. As such, only the components included in first collar component 112 and the interaction between first collar component 112 and lock nut 32 is described in detail below.

First collar component 112 is configured to engage first side 32A of lock nut 32 so that a portion of first collar component 112 is received by lock nut 32 as shown in FIG. 4. Similarly, second collar component 114 is configured to engage second side 32B of lock nut 32 that is arranged opposite first side 32A so that a portion of second collar component 114 is received by lock nut 32. When the portions of first and second collar components 112, 114 are received by lock nut 32, lock nut 32 is permitted to rotate relative to components 112, 114 and rod 22 between the unlocked position and the locked position. As such, collar 110 may be said to be mounted to rod 22 in rotational bearing engagement with lock nut 32.

First collar component 112 includes annular body 116 and annular shoulder 118 as shown in FIG. 4. Body 116 is interconnected with shoulder 118 and shoulder 118 extends outwardly away from body 116 substantially parallel to axis 23. Body 116 has radius R3 measured from axis 23, and shoulder 118 has radius R4 measured from axis 23 that is less than radius R3. When first collar component 112 is engaged with lock nut 32, shoulder 118 provides the portion of component 112 that is received by lock nut 32.

Annular body 116 and annular shoulder 118 include inner surfaces 116A, 118A, respectively, that cooperate to define bore 120 that is sized to receive rod 22 as shown in FIG. 4. Inner surface 116A is formed to include contact nubs 122 that engage rod flats 26 and that are circumferentially spaced apart from one another about axis 23. Engagement between contact nubs 122 and rod flats 26 constrains first collar component 112 against rotation with lock nut 32 relative to rod 22 and allows first collar component 112 to slide with lock nut 32 along rod 22.

In the illustrative embodiment, contact nubs 122 include four contact nubs that are circumferentially spaced about 90 degrees apart from one another about axis 23. In other embodiments, however, contact nubs 122 may include another suitable number of contact nubs that are circumferentially spaced apart from one another about axis 23 by another suitable angle.

Lock nut 32 is shown in detail. In the illustrative embodiment, lock nut 32 has a metallic construction as shown in FIG. 5. For example, lock nut 32 may be constructed of any one or more of the following materials: aluminum, brass, copper, steel, tin, nickel, or titanium. In other embodiments, however, lock nut 32 may have another suitable construction.

Lock nut 32 illustratively includes first annular surface 96 and second annular surface 98 arranged opposite first annular surface 96 as shown in FIG. 5. As suggested by FIG. 3, one of annular surfaces 96, 98 is configured to engage face 88 of lever 78 when lever 78 is engaged with lock nut 32 in cutout 74.

Lock nut 32 illustratively extends between first and second annular surfaces 96, 98 to define a generally hexagonal exterior profile as shown in FIG. 5. As such, lock nut 32 may be referred to as generally hexagonal lock nut 32. In other embodiments, however, lock nut 32 may extend between surfaces 96, 98 to define an exterior profile taking the shape of another suitable geometric form.

Lock nut 32 illustratively includes interior surface 100 that has a generally rectangular or square shape as shown in FIGS. 5-7. In other embodiments, however, interior surface 100 may take the shape of another suitable geometric form. In any case, interior surface 100 defines central aperture 102 that is sized to receive rod 22. Central aperture 102 extends through lock nut 32 from first annular surface 96 to second annular surface 98.

Interior surface 100 is illustratively formed to include lock nut threads 34 and lock nut flats 36 as shown in FIGS. 5-7. In the illustrative embodiment, lock nut threads 34 are internal threads that have a generally rectangular or square shape. Lock nut flats 36, which are positioned between lock nut threads 34 as indicated above, are illustratively embodied as, or otherwise include, generally smooth, non-threaded segments. Lock nut flats 36 may be substantially planar or may include curved portions.

Lock nut 132 is shown, for example, in detail in FIG. 6. Lock nut 132 may be used with locks 33 in place of lock nut 32. In the illustrative embodiment, lock nut 132 has a metallic construction. For example, lock nut 132 may be constructed of any one or more of the following materials: aluminum, brass, copper, steel, tin, nickel, or titanium. In other embodiments, however, lock nut 132 may have another suitable construction.

Lock nut 132 illustratively includes first annular surface 134 and second annular surface 136 arranged opposite first annular surface 134 as shown in FIG. 6. When lock nut 132 is used in place of lock nut 32 in lock system 18 and lever 78 is engaged with lock nut 132 in cutout 74, one of annular surfaces 134, 136 is configured to engage face 88 of lever 78.

Lock nut 132 includes interior surface 138 that has a generally rectangular or square shape as shown in FIG. 6. In other embodiments, however, interior surface 138 may take the shape of another suitable geometric form. Interior surface 138 defines central aperture 140 that is sized to receive rod 22. Central aperture 140 extends through lock nut 132 from first annular surface 134 to second annular surface 136.

Interior surface 138 is formed to include lock nut threads 142 as shown in FIG. 6. In the illustrative embodiment, lock nut threads 142 are internal threads that have a generally rectangular or square shape and extend substantially continuously without interruption over interior surface 138. As such, unlike interior surface 100 of lock nut 32, interior surface 138 of lock nut 132 does not include smooth, non-threaded segments.

Each of lock nut threads 142 illustratively includes helical locking segments 144, tangent segments 146, and corner segments 148 that are interconnected with one another as shown in FIG. 6. Helical locking segments 144 extend along helical paths over interior surface 138 and are configured to engage rod threads 24 to secure lock nut 132 to rod 22 in the locked position. Tangent segments 146 extend tangent to the helical paths of helical locking segments 144 over interior surface 138 and are configured to guide rod threads 24 toward segments 144 to facilitate engagement of rod threads 24 with segments 144. Corner segments 148 extend along helical paths over interior surface 138 and are configured to provide clearance between rod threads 24 and lock nut threads 142 to allow movement of lock nut 132 along rod 22 in the unlocked position.

Lock nut 132 provides clearance between rod threads 24 and lock nut threads 142 when lock nut 132 is in the unlocked position as indicated above. In contrast, when lock nut 32 is in the unlocked position, lock nut flats 36 contact rod threads 24.

The shape of lock nut threads 142 minimizes interference between rod flats 26 and lock nut threads 142 during movement of lock nut 132 between the unlocked and locked positions. Because minimized interference between lock nut threads 142 and rod flats 26 facilitates repeated engagement between lock nut threads 142 and rod threads 24, the shape of the lock nut threads 142 facilitates engagement between lock nut threads 142 and rod threads 24.

The unlocked position of lock nut 32 is shown in detail, for example, in FIG. 7. Lock nut threads 34 are disengaged from rod threads 24 in the unlocked position as indicated above. As such, movement of vehicle seat 12 relative to floor 16 along predetermined path P is permitted in the unlocked position of lock nut 32.

The locked position of lock nut 32 is shown in detail, for example, in FIG. 8. Looking into the page, lock nut 32 is illustratively rotated counterclockwise relative to rod 22 about axis 23 to move from the unlocked position to the locked position. In other embodiments, however, as indicated by bi-directional arrow 104, lock nut 32 may be rotated clockwise relative to rod 22 about axis 23 to move from the unlocked position to the locked position.

In the locked position, lock nut threads 34 and rod threads 24 are engaged with one another as shown in FIG. 8. As such, movement of vehicle seat 12 relative to floor 16 along predetermined path P is blocked in the locked position of lock nut 32.

Operation of restraint 10 is shown, for example, in FIGS. 1-8. When supported by vehicle seat 12 with lock system 18 in a locked state (i.e., in which lock nuts 32 are in the locked positions), the occupant may desire to adjust his/her position relative to floor 16. To do so, the occupant may move lock system 18 to an unlocked state (i.e., in which lock nuts 32 are in the unlocked positions). Specifically, the occupant may act on lock actuator controllers 48 to cause lock actuators 46 to rotate lock nuts 32 clockwise relative to rods 22 and collars 110 about axes 23 to the unlocked positions. In one example, the occupant may pull upwardly on a member included in, or otherwise coupled to, each of lock actuator controllers 48 to act on lock actuator controllers 48. In another example, the occupant may provide input to cause an electrically-powered, pneumatically-powered, or hydraulically-powered device to act on one or both of lock actuator controllers 48. Once the occupant has moved lock system 18 to the unlocked state, the occupant may apply occupant forces to vehicle seat 12 to adjust his/her position relative to floor 16. Movable rails 64 move relative to rail receivers 62 and rods 22 along paths P as the occupant adjusts his/her position. Lock nuts 32, collars 110, and lock actuators 46 move along lengths L of rods 22 as the occupant adjusts his/her position.

When supported by vehicle seat 12 with lock system 18 in the unlocked state, the occupant may desire to fix his/her position relative to floor 16. To do so, the occupant may move lock system 18 from the unlocked state to the locked state. Specifically, the occupant may act on lock actuator controllers 48 to cause lock actuators 46 to rotate lock nuts 32 counterclockwise relative to rods 22 and collars 110 about axes 23 to the locked positions. Once the occupant has moved lock system 18 to the locked state, occupant forces applied to vehicle seat 12 by the occupant will no longer suffice to adjust the position of vehicle seat 12 relative to floor 16.

The invention claimed is:

1. A restraint for a vehicle, the restraint comprising
a vehicle seat configured to support an occupant of the vehicle above a floor of the vehicle,
a foundation configured to interconnect the vehicle seat to the floor to permit movement of the vehicle seat relative to the floor along a predetermined path, and
a lock system configured to block selectively movement of the vehicle seat relative to the floor along the predetermined path, the lock system including a lock unit having a rod including rod threads extending along the length of the rod and a plurality of rod flats positioned between the rod threads along the length of the rod and a lock nut including lock nut threads and a plurality of lock nut flats positioned between the lock nut threads, the lock nut being sized to receive the rod therein and mounted to rod to move relative to the rod between an unlocked position in which the lock nut threads are disengaged from the rod threads to permit movement of the vehicle seat relative to the floor along the predetermined path and a locked position in which the lock nut threads engage the rod threads to block movement of the vehicle seat relative to the floor.

2. The restraint of claim 1, wherein the rod threads are external threads arranged to extend toward the lock nut and the lock nut threads are internal threads arranged to extend toward the rod.

3. The restraint of claim 1, wherein the lock nut includes an interior surface defining a central passageway formed in the lock nut and sized to receive the rod therein.

4. The restraint of claim 3, wherein the interior surface of the lock nut has a generally rectangular shape when viewed in cross section.

5. The restraint of claim 4, wherein the interior surface of the lock nut is formed to include the lock nut threads and the lock nut flats.

6. The restraint of claim 1, wherein the foundation includes at least one rail unit having a rail receiver adapted to couple the floor in a fixed position relative to the floor and a rail sized to be received by the rail receiver and movable relative to the rail receiver to permit movement of the vehicle seat relative to the floor along the predetermined path and the rod is located in an interior space defined in part between the rail receiver and the rail.

7. The restraint of claim 6, wherein the rail is formed to include a cutout and the lock nut is located in the cutout when the rod is located in the interior space and the lock nut is in the unlocked position or the locked position.

8. The restraint of claim 1, wherein the lock unit includes a lock actuator configured to move the lock nut between the unlocked position and the locked position.

9. The restraint of claim 8, wherein the lock actuator comprises a lever configured to engage the lock nut.

10. The restraint of claim 9, wherein the lever is formed to include a controller aperture sized to receive a lock actuator controller therein.

\* \* \* \* \*